United States Patent
Beckenbaugh et al.

(10) Patent No.: US 7,530,041 B1
(45) Date of Patent: May 5, 2009

(54) SYSTEM AND METHOD FOR AUTO-ROUTING JOG ELIMINATION

(75) Inventors: Mark R. Beckenbaugh, Rochester, MN (US); Michael D. Cesky, Rochester, MN (US); Jason J. Freerkesn, Rochester, MN (US); Nicholas G. Young, Rochester, MN (US); John W. Zack, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/124,119

(22) Filed: May 20, 2008

(51) Int. Cl.
*G06F 17/50* (2006.01)
(52) U.S. Cl. .............................. 716/13; 716/12; 716/14
(58) Field of Classification Search ................ 716/1, 716/4, 5, 8–14
See application file for complete search history.

(56) References Cited

U.S. PATENT DOCUMENTS

2003/0229862 A1  12/2003  Li et al.

OTHER PUBLICATIONS

Bamji et al. "Incremental Autojogging Using Range Spaces" VSLI Design, 1998. Proceedings., 1998 Eleventh International Conference pp. 265-268.
Matsumoto et al. "Symbolic Design Methodology for High-Density Macro-Cell", Custom Integrated Circuits Conference, May 1998., Proceedings, pp. 7.3/1-7.3/4.
Groeneveld, Patrick "A Multiple Layer Contour-Based Gridless Channel Router", IEEE Transactions on Computer-Aided Design, vol. 9, No. 12, Dec. 1990.

*Primary Examiner*—Sun J Lin
(74) *Attorney, Agent, or Firm*—King & Spalding LLP

(57) ABSTRACT

A method for automatic wire size modification comprising the steps of routing a wire to a source; detecting a first size differential between the wire and the source by calculating a width difference between a width of the wire and a width of the source, and dividing the width difference by the width of the wire; and modifying a size of the wire if the first size differential is less than a maximum width percentage and if a length of the source is less than a length range specified by a user.

1 Claim, 8 Drawing Sheets

SYSTEM AND METHOD FOR AUTO-ROUTING JOG ELIMINATION

CROSS REFERENCE TO RELATED APPLICATION

The present application is related to concurrently filed, co-pending, and commonly assigned U.S. patent application entitled SYSTEM AND METHOD FOR AUTO-ROUTING JOG ELIMINATION, the disclosure of which is hereby incorporated herein by reference.

BACKGROUND OF THE INVENTION

1. Field of the Invention

The present invention relates to a system and method for designing and fabricating circuits. Specifically, the present invention relates to a system and method for automatically modifying wire sizes to, for example, eliminate undesirable edges or "jogs" in a wiring tool.

2. Description of Background

The process of designing and fabricating a circuit, e.g., with the use of a circuit mask design editor, may include the use of an auto wiring tool. The auto wiring tool fabricates wires using the input design and rules based on the technology being employed and the physical demands placed on the circuit. For example, a rule that may be employed during the fabrication process is a minimum feature distance requirement which ensures that every wire and source is wide enough to function properly. Those of ordinary skill in the art will appreciate that the wiring tool may be automated as well as manually operated.

Many times the wires created with a wiring tool include edges or jogs. A jog is an edge that is shorter than the minimum width of the metal used to make the wire. Often times, jogs create unnecessary edges or corners, that can be detrimental to the yield of the design because they can require added mask compensation shapes which cause what is known as a blooming effect during optical proximity correction or OPC.

One solution for this problem is to have the user manually edit the size of the wire or resulting shape after production. Another solution is to run a wire straightening program after the wires and jogs are created with the auto wiring tool. This may also be applied during post processing and may be run on the entire design. It is clear that these solutions are not favorable or cost effective. The disadvantages to these solutions include the inefficiencies created by the additional post processing step and the additional costs associated with adding steps to the production process.

A further solution to eliminating unwanted jogs is through the use of cost analysis. A cost value is assigned to each wire placement option indicating the cost of the jog that would result in the masking process corresponding to that placement, wherein a greater cost indicates that a more undesirable jog would be created in the masking process than would be created by a placement assigned a lesser cost. The placement having the lowest cost of the plurality of possible placements is selected. This solution provides a good solution to minimizing small jogs, however, if the wire width and length is small relative to the connecting wire width, it could be beneficial and effective to extend the wire width of the routed wire to match that of the wire being routed to.

SUMMARY OF THE INVENTION

A method for automatic wire size modification, the method comprising the following steps: routing a wire to a source, where the source includes other wires, metals or vias to which the wire is routed; detecting a first size differential between the wire and the source by calculating a width difference between a width of the wire and a width of the source, and dividing the width difference the width of the wire; and modifying a size of the wire if the first size differential is less than a maximum width percentage and if a length of the source is less than a length range specified by a user.

It is an object of the present invention to remove and minimize unwanted jogs during the design and fabrication process of circuits.

The present invention is advantageous over previous solutions because small jogs are removed during auto routing thus eliminating the additional post-fabrication steps of having to correct the undesirable edges created in the process of wiring circuits with an auto routing tool.

An additional advantage is that the extracted simulation results will be more accurate because changes are not made post process, but rather prior to post process, thus creating more stable designs.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from an computer-usable or computer-readable medium providing program code for use by or in connection with a computer or any instruction execution system.

Figure 1:
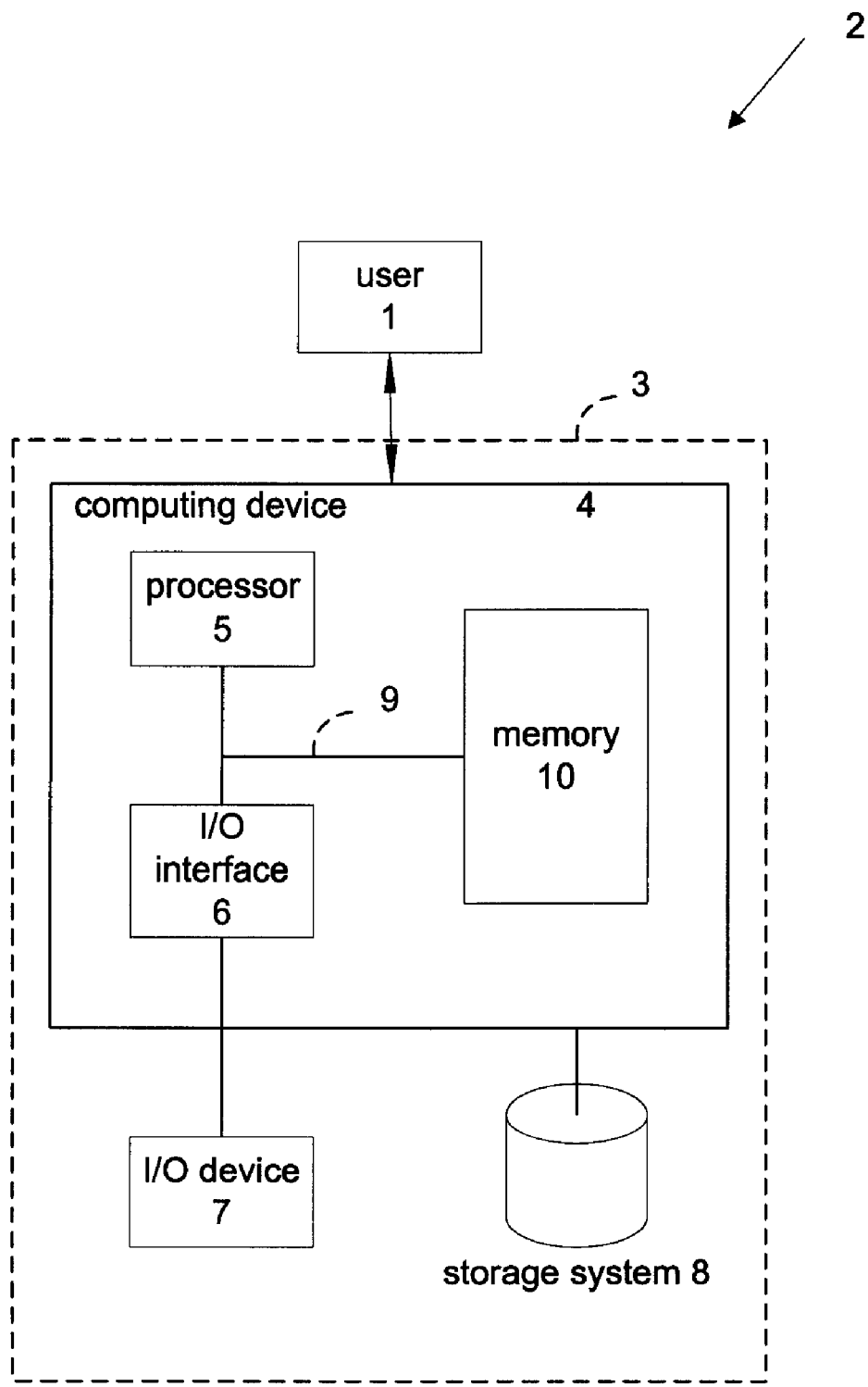
FIG. 1 illustrates an exemplary environment for managing the processes in accordance with the invention.

With reference to the accompanying drawings, FIG. 1 shows an illustrative environment 2 for computer user 1 to manage the processes in accordance with the invention. To this extent, the environment 2 includes a computer infrastructure 3 that can perform the processes described herein. In particular, the computer infrastructure 3 is shown including a computing device 4 operable to perform the processes described herein. The computing device 4 is shown including a processor 5, a memory 10, an input/output (I/O) interface 6, and a bus 9. Further, the computing device 4 is shown in communication with an external I/O device/resource 7 and a storage system 8. As is known in the art, in general, the processor 5 executes computer program code, which is stored in memory 10 and/or storage system 8. While executing computer program code, the processor 5 can read and/or write data, such as the range boundary 50, to/from memory 10, storage system 8, and/or I/O interface 6. The bus 9 provides a communications link between each of the components in the computing device 4. The I/O device 7 can comprise any device that enables an individual to interact with the computing device 4 or any device that enables the computing device 4 to communicate with one or more other computing devices using any type of communications link.

The computing device 4 can comprise any general purpose computing article of manufacture capable of executing computer program code installed thereon (e.g., a personal computer, server, handheld device, etc.). However, it is understood that the computing device 4 is only representative of various possible equivalent computing devices that may perform the processes described herein. Similarly, the computer infrastructure 3 is only illustrative of various types of computer infrastructures for implementing the invention. For example, in one embodiment, the computer infrastructure 3 comprises two or more computing devices (e.g., a server cluster) that communicate over any type of communications link, such as a network, a shared memory, or the like, to perform the process described herein.

Figure 2A:
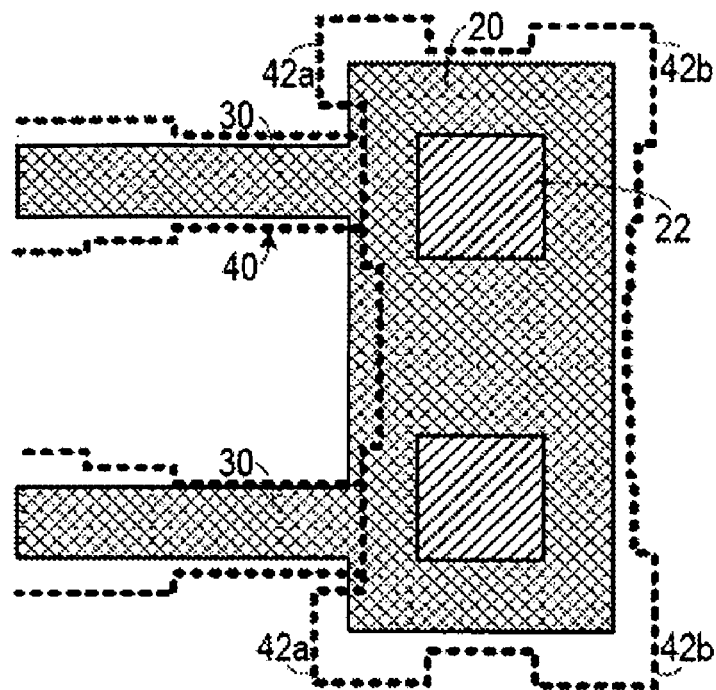
FIG. 2A illustrates an exemplary wiring in accordance with the prior art.

FIG. 2A illustrates an exemplary wiring according to prior art. Source 20 and wires 30 represent an exemplary design input into the auto wiring tool, e.g., masking tool. It is understood by those with ordinary skill in the art that source 20 may be different components (e.g., other wires, metals or vias) of a chip for which wiring is implemented. In this example, source 20 is used to couple wires 30 to vias 22. Resulting shape 40 is created by the auto wiring tool. Resulting shape 40 includes several jogs 42a and 42b that result from the fabrication process. Some of these jogs are undesirable because they may be detrimental to the yield of the design.

Figure 2B:
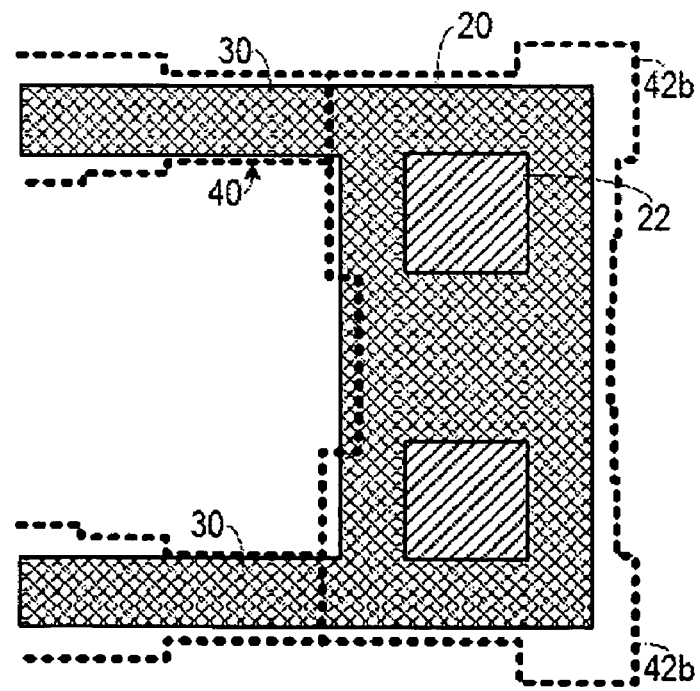
FIG. 2B illustrates another exemplary wiring in accordance with the prior art.

As shown in FIG. 2B, if wire 30 is aligned with source 20, then the unwanted jogs may be eliminated. For example, in FIG. 2B, jogs 42a depicted in FIG. 2A are no longer present in resulting shape 40. As described above, currently, a wire straightening program must be manually run after the wiring tool in order to remove unwanted jogs such as jogs 42a.

Figure 3A:
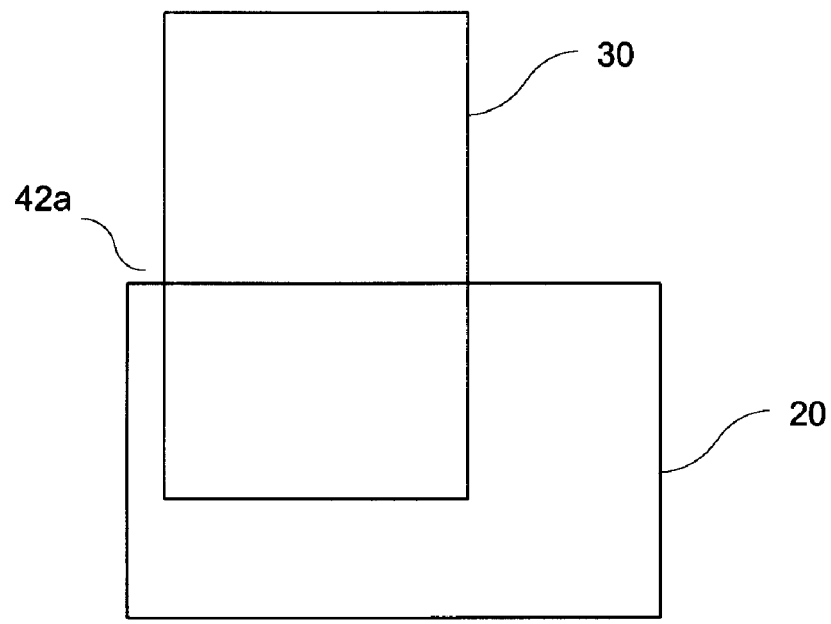
FIG. 3A illustrates an exemplary wiring with an exemplary jog.
Figure 3B:
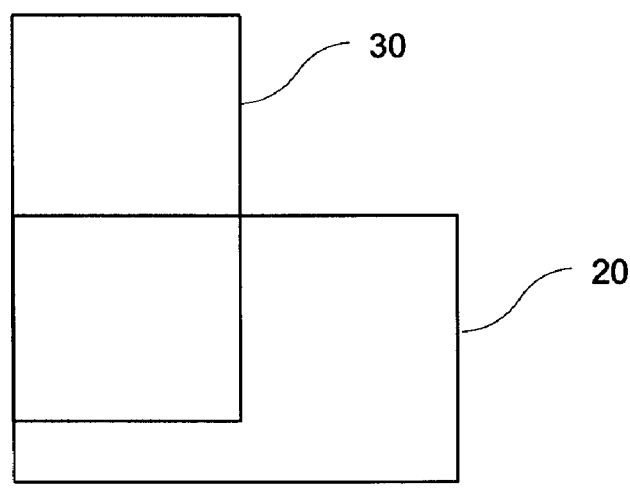
FIG. 3B illustrates an exemplary wiring in accordance with one exemplary embodiment of the present invention.

One objective of auto routers is to connect two points with the shortest path possible. For example, when the auto router starts creating a wire, it is desirable for the edge of wire 30 to line up with the edge of the target source 20 of the same metal, as shown in FIG. 3B, rather than the misalignment depicted in FIG. 3A. The auto router will stray from the shortest path based on the costs that are implemented into the wiring algorithm.

Figure 4A:
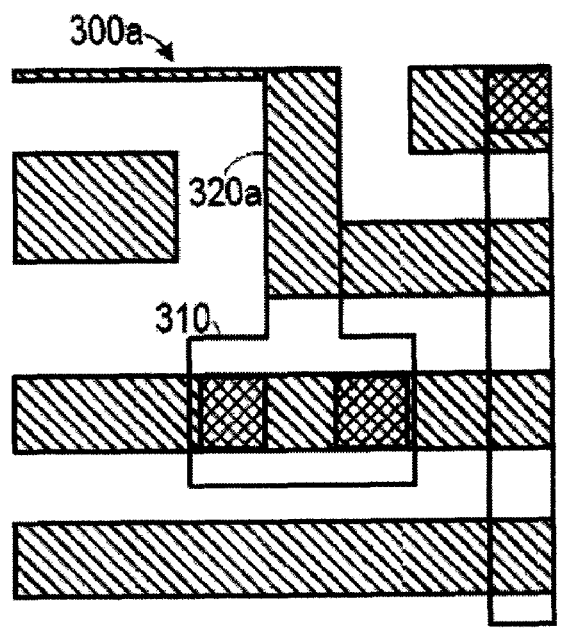
FIG. 4A illustrates an exemplary wiring in accordance with one exemplary embodiment of the present invention.
Figure 4B:
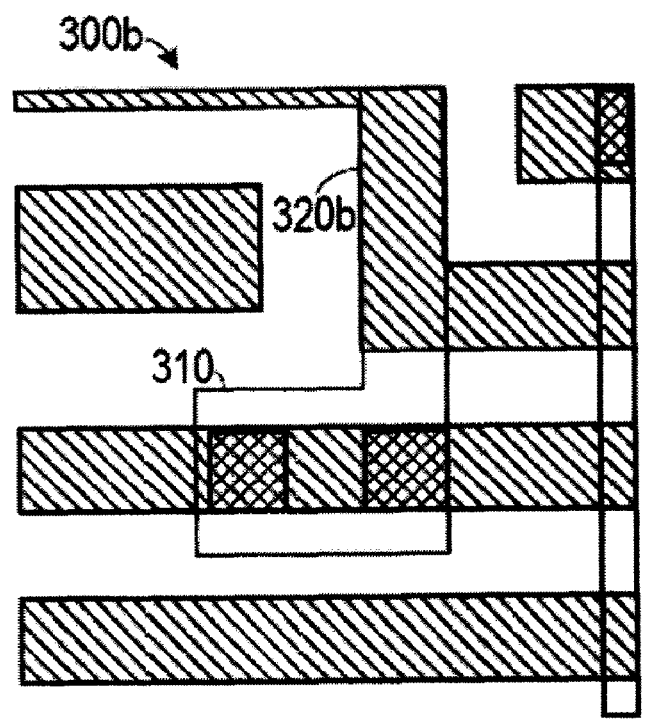
FIG. 4B illustrates an exemplary wiring in accordance with one exemplary embodiment of the present invention.

In addition, when the router places via 22 to change to an adjacent metal level, it is desirable for the edges of via 22 to line up with the existing edge of the wire 30. As mentioned above, a cost-based wire placement solution may eliminate unwanted jogs 42a. However, if the wire width of the routed wire is not equal to, but is relatively close to, that of the wire being routed to the metal level, unwanted jogs may not be eliminated. For example, a less-than-preferred routing 300a is shown in FIG. 4A, in which a wire 320a is routed to the center of a shape 310. A more preferable routing 300b is shown in FIG. 4B, in which the wire 320b is routed so as to be flush with the selected edge of the shape 310.

Figure 5A:
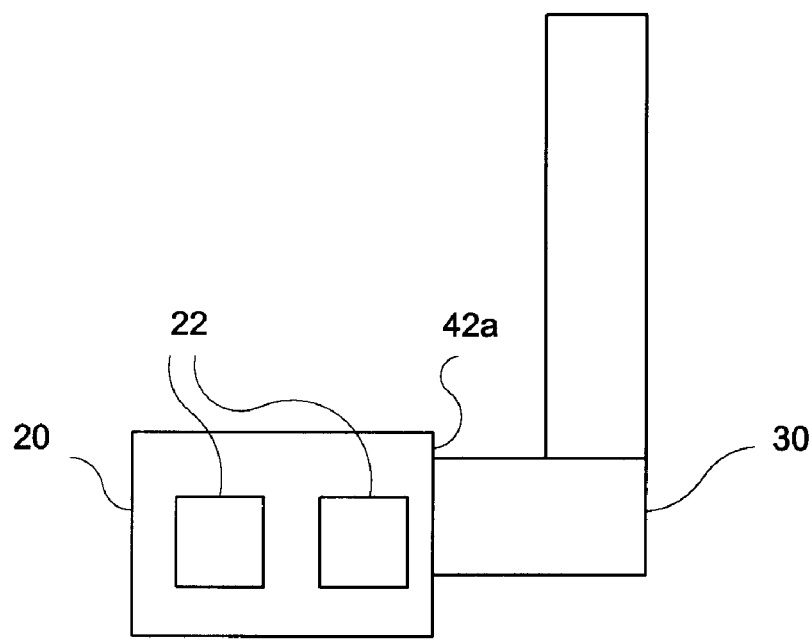
FIG. 5A illustrates an exemplary wiring with an exemplary jog.
Figure 5B:
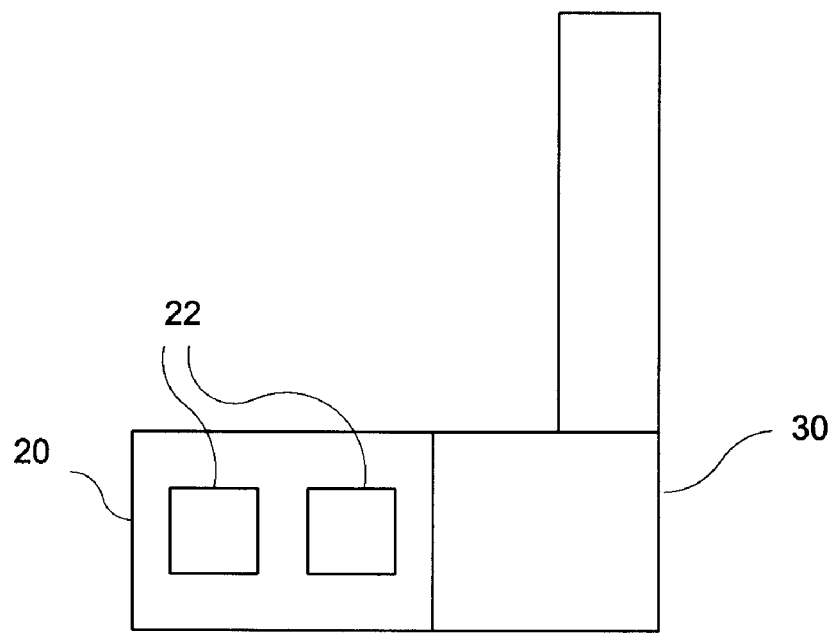
FIG. 5B illustrates an exemplary wiring in accordance with one exemplary embodiment of the present invention.

The present invention eliminates unwanted jogs by altering the width of connecting wires. For example, FIG. 5A illustrates the placement of wire 30 to source 20 with an auto router. The placement of wire 30 to source 20 by the auto router creates unwanted jog 42a. In accordance with a preferred embodiment of the present invention, the unwanted jog 42a is eliminated by altering the width of wire 30. FIG. 5B illustrates an exemplary wiring in accordance with a preferred embodiment of the present invention. In FIG. 5B, the width of wire 30 is altered to match the width of source 20.

According to this embodiment of the invention, if the width of the wire being routed, e.g., wire 30, is less than a predefined percentage of the width of the shape being routed to, e.g., source 20, and the length of the wire segment being routed is less than a predefined percentage of the width of the source being routed to then the routed segment's width is extended to match the width of the source being routed to. This may be calculated, for example, by increasing the width of wire 30 if (a) the difference between the length of wire 30 and the width of source 20 divided by the width of source 20 is less than a predefined maximum length percentage; and (b) the difference between the width of source 20 and wire 30 divided by the width of source 20 is less than a predefined maximum width percentage. Exemplary pseudo code for the described algorithm may include:

```
if(|(L1-W2)/W2|<Max Length %) {
   if(|(W2-W1)/W2|<Max Width %) {
      Remove Jogs;
   }
   else {
      Do Not Remove Jogs;
   }
}
```

Figure 6A:
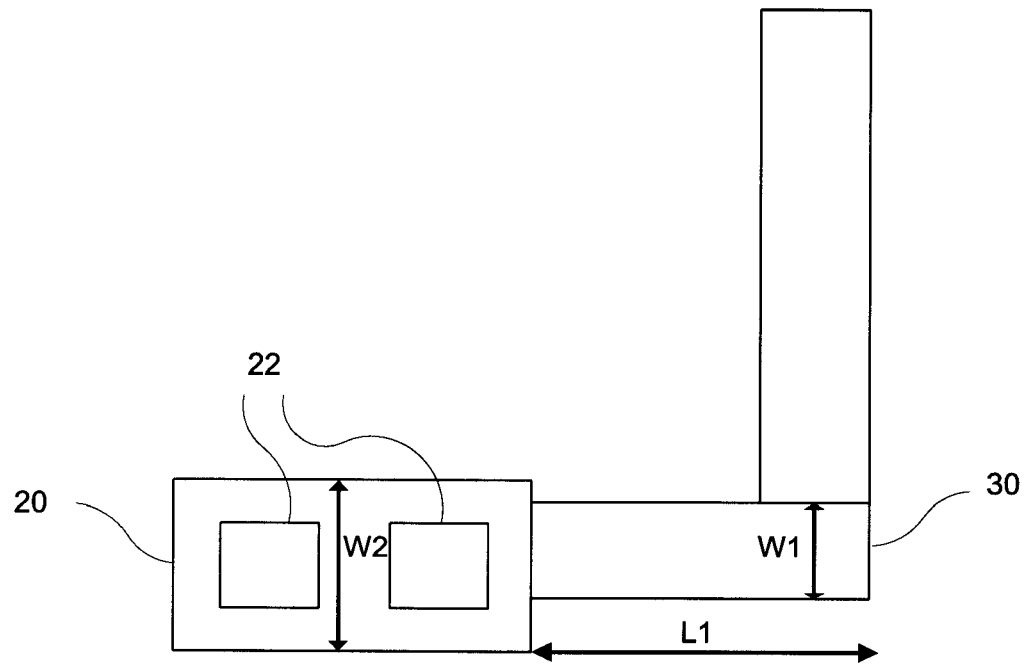
FIG. 6A illustrates an exemplary wiring in accordance with one exemplary embodiment of the present invention.

FIG. 6A illustrates an exemplary embodiment indicating the variables in the above algorithm. Specifically, L1 in the above algorithm is the length of the wire 30 being routed, and W1 is the width of the wire 30 being routed. W2 is the width of the source 20 to be routed. The algorithm is iterative in nature and may be integrated into the auto router such that if the algorithm fails, information may be fed back to the auto router.

Figure 5C:
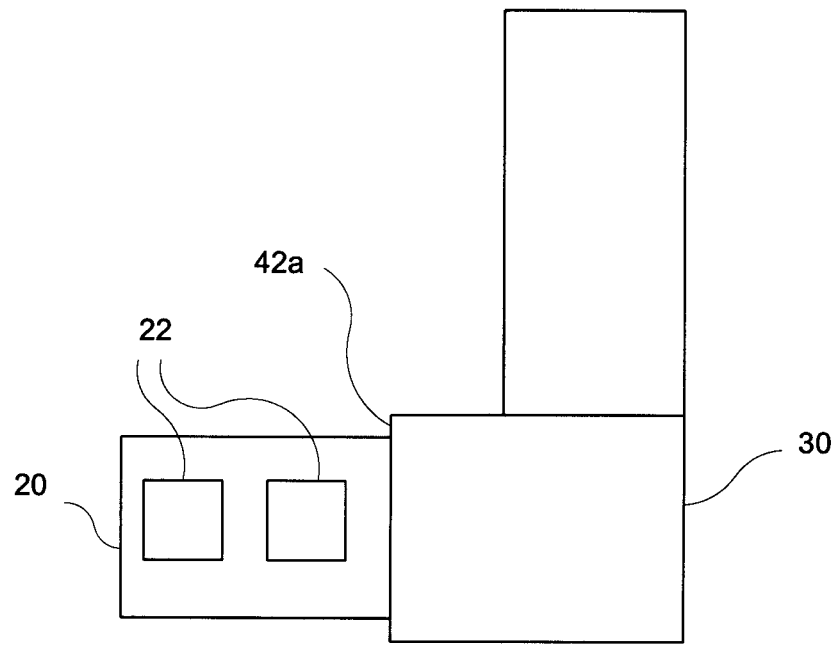
FIG. 5C illustrates an exemplary wiring with an exemplary jog.
Figure 5D:
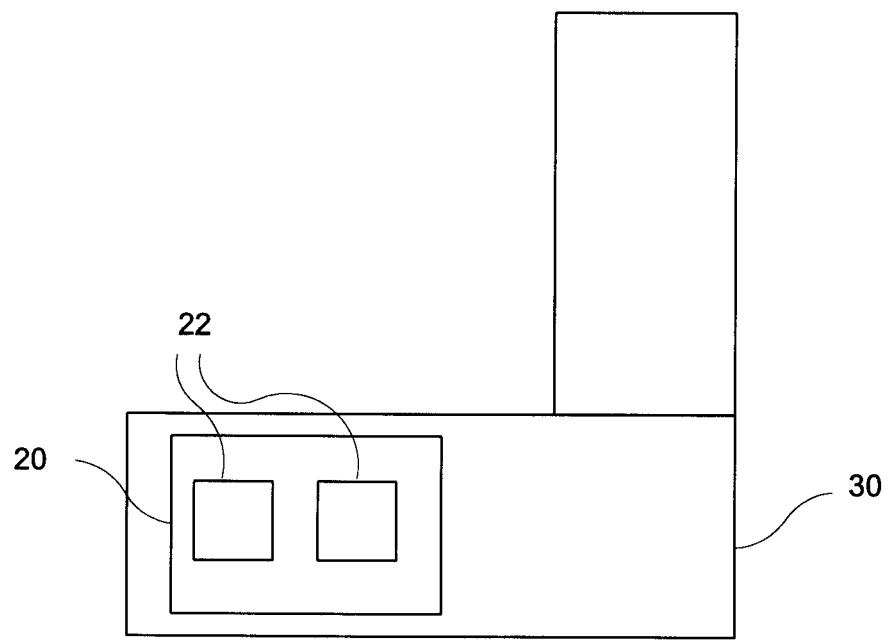
FIG. 5D illustrates an exemplary wiring in accordance with one exemplary embodiment of the present invention.

FIG. 5C illustrates another placement of wire 30 to source 20 with an auto router. In this example, the width of wire 30 is larger than the width of source 20. Similar to the illustrations above, this creates an unwanted jog 42a. In another preferred embodiment of the present invention, the jog can be removed by altering the length of wire 30. For example, the length of wire 30 may be lengthened with the use of a metal extender. This may be calculated, for example, by increasing the length of wire 30 if (a) the difference between the width of the wire 30 and the width of source 20 divided by the width of wire 30 is less than a predefined percentage; and (b) the length of source 20 is less than a user specified range. Exemplary pseudo code for the described algorithm may include:

```
if(|(W1-W2)/W1|<Max Width %) {
   if(L2<User Specified Length Range) {
      Remove Jogs;
   }
   else {
      Do Not Remove Jogs;
   }
}
```

Figure 6B:
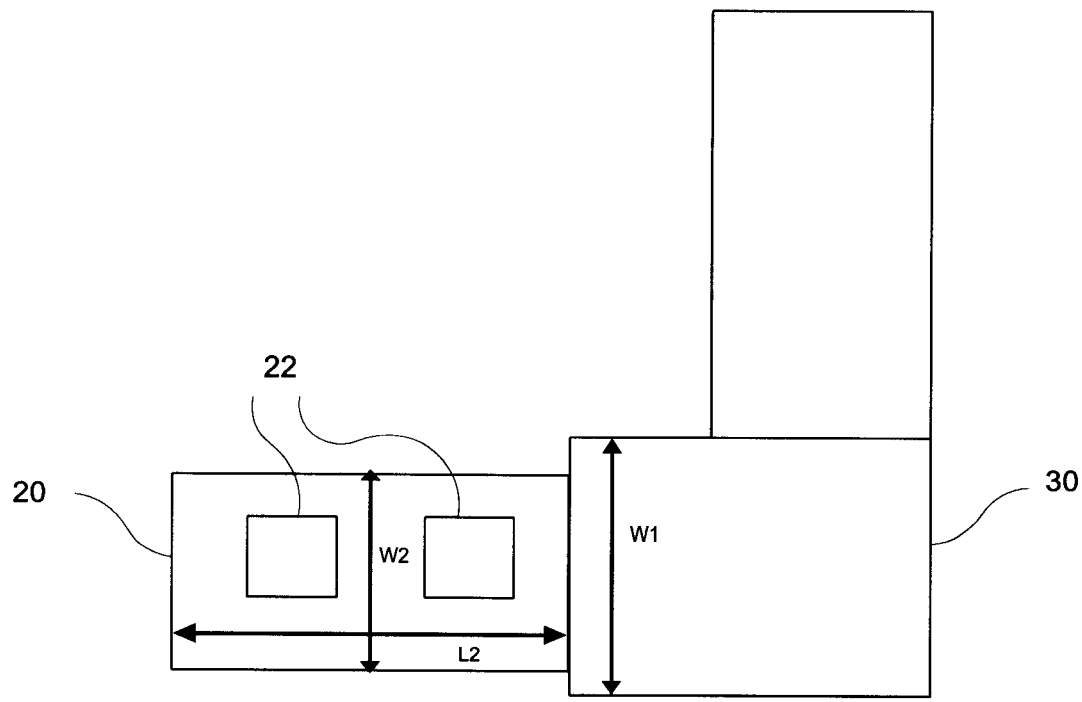
FIG. 6B illustrates an exemplary wiring in accordance with one exemplary embodiment of the present invention.

FIG. 6B illustrates an exemplary embodiment indicating the variables in the above algorithm. Specifically, W1 in the above algorithm again represents the width of the wire being routed and W2 represents the width of the source being routed to, e.g., source 20. L2 is the length of the source being routed to. The algorithm above is also iterative in nature and may be integrated into the auto router such that if the algorithm fails, information may be fed back to the auto router.

Figure 7:
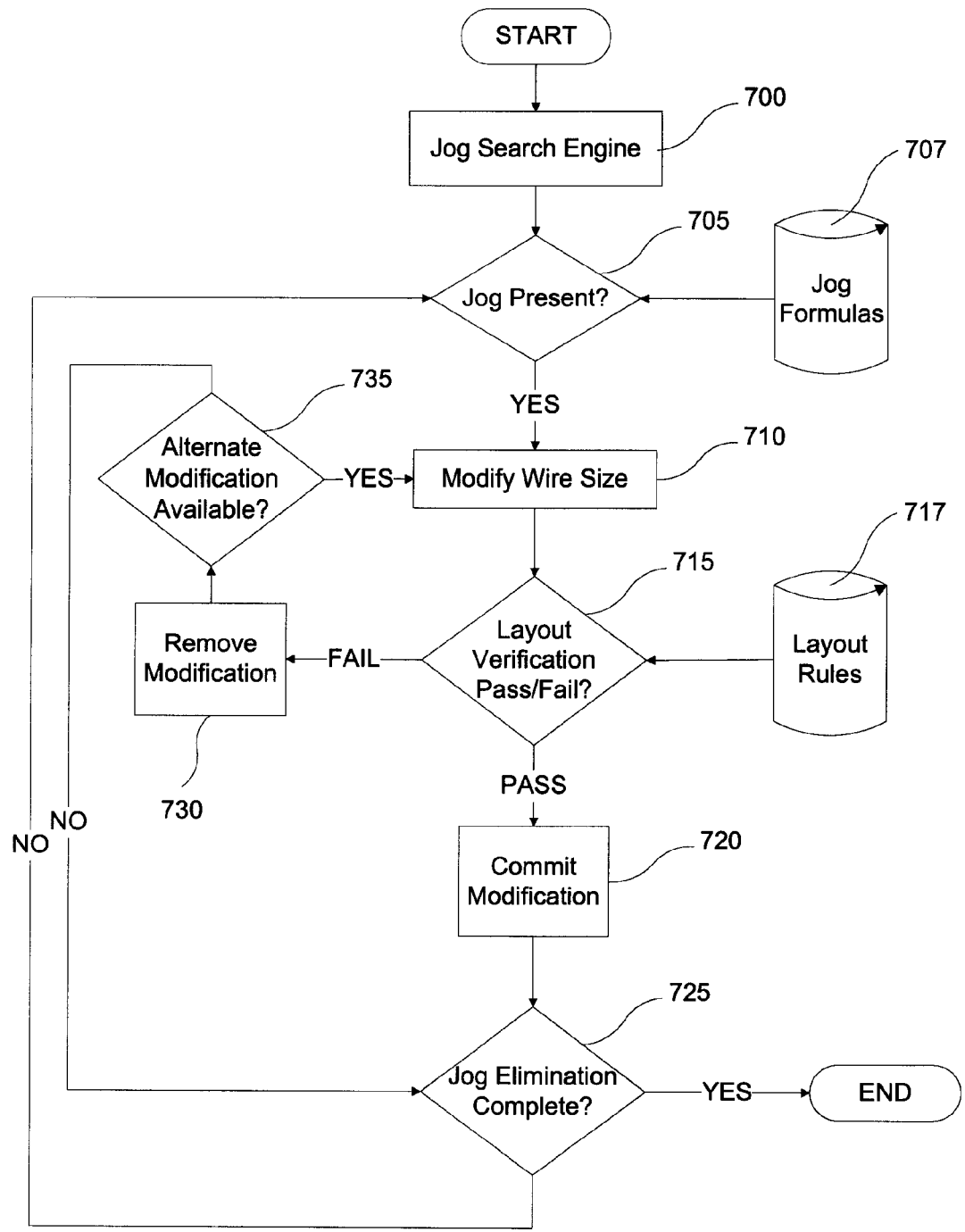
FIG. 7 illustrates an exemplary jog elimination process in accordance with one exemplary embodiment of the present invention.

These jog elimination algorithms may be implemented through the exemplary process illustrated in FIG. 7. Jog search engine 700 is a part of the wire routing process. At step 705, it is determined whether a jog is present by using jog formulas of database 707. If a jog is not present, the jog elimination process ends. If, on the other hand, a jog is present, the wire size is modified at step 710. The layout of the modified wire is checked at step 715 using the layout rules in database 717. If the layout verification step 715 is passed, the modification of the wire size is committed at step 720. If the layout verification step 715 is failed, the last made modification is removed at step 730. The system then checks whether there is an alternate modification available at step 735. If there is an alternate modification available, the process returns to step 710. If there is no alternate modification available, the system continues to step 725 and checks whether the jog elimination process is complete. If the process is complete, the jog elimination process ends. If the process is not complete, the system returns to step 705 to determine whether other jogs are present.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is;

1. A method for automatic wire size modification, the method comprising the following steps:
   routing a wire to a source, wherein the source includes other wires, metals or vias to which the wire is routed;
   detecting a first size differential between the wire and the source by calculating a width difference between a width of the wire and a width of the source, and dividing the width difference by the width of the wire; and
   modifying a size of the wire if the first size differential is less than a maximum width percentage and if a length of the source is less than a length range specified by a user.

* * * * *

UNITED STATES PATENT AND TRADEMARK OFFICE
CERTIFICATE OF CORRECTION

| | |
|---|---|
| PATENT NO. | : 7,530,041 B1 |
| APPLICATION NO. | : 12/124119 |
| DATED | : May 5, 2009 |
| INVENTOR(S) | : Mark R. Beckenbaugh et al. |

It is certified that error appears in the above-identified patent and that said Letters Patent is hereby corrected as shown below:

Title page, section [75], "Freerkesn" should read --Freerksen--.

Signed and Sealed this

Twenty-second Day of September, 2009

David J. Kappos
*Director of the United States Patent and Trademark Office*